US009900864B2

(12) United States Patent
Lin

(10) Patent No.: US 9,900,864 B2
(45) Date of Patent: Feb. 20, 2018

(54) METHOD AND SYSTEM FOR REQUESTING PHYSICAL MULTICAST CHANNEL

(71) Applicant: ZTE CORPORATION, Shenzhen, Guangdong Province (CN)

(72) Inventor: Yan Lin, Shenzhen (CN)

(73) Assignee: ZTE CORPORATION (CN)

( * ) Notice: Subject to any disclaimer, the term of this patent is extended or adjusted under 35 U.S.C. 154(b) by 95 days.

(21) Appl. No.: 14/421,644

(22) PCT Filed: Jul. 23, 2013

(86) PCT No.: PCT/CN2013/079854
§ 371 (c)(1),
(2) Date: Feb. 13, 2015

(87) PCT Pub. No.: WO2013/178158
PCT Pub. Date: Dec. 5, 2013

(65) Prior Publication Data
US 2015/0208379 A1 Jul. 23, 2015

(30) Foreign Application Priority Data

Aug. 14, 2012 (CN) .......................... 2012 1 0288641

(51) Int. Cl.
H04W 72/00 (2009.01)
H04W 4/06 (2009.01)
(Continued)

(52) U.S. Cl.
CPC .......... H04W 72/005 (2013.01); H04W 4/06 (2013.01); H04L 12/18 (2013.01); H04L 12/189 (2013.01);
(Continued)

(58) Field of Classification Search
CPC ............ H04L 12/189; H04W 36/0061; H04W 36/0072; H04W 4/06; H04W 72/005;
(Continued)

(56) References Cited

U.S. PATENT DOCUMENTS 8,396,492 B2 * 3/2013 Hu ........................ H04W 72/02
370/312
2011/0292861 A1 12/2011 Gou et al.
(Continued)

FOREIGN PATENT DOCUMENTS

CN 102316418 12/2011
CN 102833688 12/2012

OTHER PUBLICATIONS

International Search Report for International Patent Application No. PCT/CN2013/079854 dated Oct. 24, 2013.

Primary Examiner — Ian N Moore
Assistant Examiner — Mewale Ambaye
(74) Attorney, Agent, or Firm — McAndrews, Held & Malloy, Ltd.

(57) ABSTRACT

A method and system for requesting a Physical PMCH are provided. The method includes: user equipment determines a target cell to be immigrated which is adjacent to a cell where the user equipment is located; and if the user equipment judges that a preconfigured Multicast Broadcast Single Frequency Network (MBSFN) area in the adjacent target cell does not comprise the MBSFN area used by the Multimedia Broadcast Multicast Service (MBMS) service/group call currently received by the user equipment, the user equipment requests a network side equipment to allocate a PMCH for the currently received MBMS service/group call. According to the technical solution provided in the present (Continued)

invention, the service continuity of the PTT communication user in a receiving state during the moving process is implemented.

8 Claims, 4 Drawing Sheets

(51) Int. Cl.
| | |
|---|---|
| *H04L 12/18* | (2006.01) |
| *H04W 88/08* | (2009.01) |
| *H04W 36/08* | (2009.01) |
| *H04W 48/20* | (2009.01) |
| *H04W 48/12* | (2009.01) |
| *H04W 36/00* | (2009.01) |

(52) U.S. Cl.
CPC ........ *H04W 36/0061* (2013.01); *H04W 36/08* (2013.01); *H04W 48/12* (2013.01); *H04W 48/20* (2013.01); *H04W 88/08* (2013.01)

(58) Field of Classification Search
CPC ..... H04W 48/12; H04W 48/20; H04W 88/08; H04W 36/08
See application file for complete search history.

(56) References Cited

U.S. PATENT DOCUMENTS

| | | | |
|---|---|---|---|
| 2012/0213142 A1* | 8/2012 | Van Lieshout | H04W 72/121 370/312 |
| 2012/0236776 A1* | 9/2012 | Zhang | H04W 48/12 370/312 |
| 2013/0183973 A1* | 7/2013 | Amerga | H04W 36/0083 455/436 |
| 2013/0336173 A1* | 12/2013 | Mandil | H04W 36/0072 370/280 |
| 2014/0036676 A1* | 2/2014 | Purnadi | H04W 36/0055 370/235 |
| 2014/0293859 A1* | 10/2014 | Liang | H04W 36/28 370/312 |

* cited by examiner

METHOD AND SYSTEM FOR REQUESTING PHYSICAL MULTICAST CHANNEL

CROSS-REFERENCE TO RELATED APPLICATIONS/INCORPORATION BY REFERENCE

This application is a 371 of International Patent Application No. PCT/CN2013/079854, filed Jul. 23, 2013, entitled "REQUEST METHOD AND SYSTEM OF PHYSICAL MULTICAST CHANNEL", which claims priority to Chinese Patent Application No. 201210288641.2, filed Aug. 14, 2012, entitled "REQUEST METHOD AND REQUEST SYSTEM OF MULTICAST PHYSICAL CHANNEL (PMCH)". The above-identified applications are hereby incorporated herein by reference in their entirety.

FIELD OF THE INVENTION

The disclosure relates to the field of communications, and in particular to a method and system for requesting a Physical Multicast Channel (PMCH).

BACKGROUND OF THE INVENTION

Push to talk (PTT) communication service is a half-duplex service which may achieve one-to-many communication, which is characterized in that when PTT User Equipment (UE) initiates a group call service, a voice message thereof can be transmitted to each member of a preset PTT group simultaneously, and the service may be established rapidly. Based on the above characteristics, the PTT communication system has been widely used in many industries and occasions of government agency, public security, energy and traffic, airport and seaport, industrial and mining enterprise, military and fair or the like.

The current PTT communication system is generally developed based on the second generation mobile communication technology, i.e., a Global System for Mobile Communications technology (GSM). With the maturity and commercial popularization of the mobile communication technology, the PTT communication system must be evolved into a system which adopts 3G or 4G communication technologies. The PTT communication system has been evolved into a new system. Meanwhile, various scientific research institutions also do research on technologies in which a PTT system is combined with a public system. When the PTT system is combined with the public network or a very large number of customers use the PTT system, the coverage area of the PTT system needs to be expanded, multiple PTT cells may be managed, and therefore the PTT user equipment may also be distributed in multiple cells. Both of the user equipment for speaking and the user equipment for listening in the PTT system will change the cells due to location moving. Thus, for the user equipment for speaking and the user equipment for listening in the PTT system, the PTT system needs to have a mobility management function.

The enhanced Multimedia Broadcast Multicast Service (eMBMS) introduced by the fourth generation mobile communication Long-Term Evolution (LTE) system applies to the user equipment with a video function, which receives a digital audio/video service in a form of broadcast/multicast through the PMCH. In view of the characteristics of the eMBMS service, the eMBMS service may be used to achieve a data transfer function of calling and listening users of the PTT group. One eMBMS service transmission and receiving process is used as one data transmission and receiving process of the calling and listening user of the group, while a Temporary Mobile Group Identity (TMGI) defined in a protocol may also be used as an identifier of the PTT group. The UE obtains a TMGI of a group to which the current UE belongs according to a group information update process. In an MBMS process, each UE may judge whether belong to the group according to the TMGI.

In the protocol of the related art, when the user who is receiving the eMBMS service moves, no implementation method is given to the user about how to keep the service continuity, in which the above user moving may include that: the UE in a Radio Resource Control Idle (RRC_IDLE) state performs cell reselection, or the UE in a Radio Resource Control Connected (RRC_CONNECTED) state performs cell handover. According to the protocol of the related art, if UE moving does not result in a change of a Multicast Broadcast Single Frequency Network (MBSFN) area, the service will keep the continuity automatically. However, if the target cell does not contain the MBSFN area where the UE is receiving the service in an original cell, the UE needs to read mib, sib1 and sib13 of the target cell, and then reads a PMCH resource of a group needed to be received by the user from a Multipoint Control Channel (MCCH) according to the configuration of sib13. For the slowly moving user, if a PBCH channel of the target cell has good enough quality, the UE can configure the PMCH resource of the current MBMS service/group call in the target cell rapidly, during which the signal quality of the PMCH of the original cell can also keep the service continuity. However, for the fast moving user, if the Physical Broadcast Channel (PBCH) channel of the target cell has bad quality, before the PMCH configuration of the target cell is read, the signal quality of the PMCH of the original cell will quickly reduce, thereby resulting in temporary voice interruption, and reducing the user experience due to the fact that the above defects are contrary to the characteristics of rapid and efficient service of the PTT communication system.

SUMMARY OF THE INVENTION

The disclosure provides a method and system for requesting a PMCH, by which the problem in the related art that the service cannot be received continuously when the UE which is receiving the eMBMS service moves is solved.

According to one aspect of the disclosure, a method for requesting a PMCH is provided.

The method for requesting the PMCH according to the disclosure includes: the user equipment determines a target cell to be immigrated which is adjacent to a cell where the user equipment is camped on; and if the user equipment judges that a preconfigured MBSFN area in the adjacent target cell does not include the MBSFN area used by the Multimedia Broadcast Multicast Service (MBMS) service/group call currently received by the user equipment, the user equipment requests a network side equipment to allocate a PMCH for the currently received MBMS service/group call.

Preferably, the user equipment requests the network side equipment to allocate the PMCH for the currently received MBMS service/group call includes: the user equipment requests the network side equipment to allocate the PMCH for the currently received MBMS service/group call while the user equipment continuously receives the currently received MBMS service/group call by using the PMCH of the cell where the user equipment is camped on corresponding to the MBSFN area used by the currently received MBMS service/group call.

Preferably, after the user equipment requests the network side equipment to allocate the PMCH for the currently received MBMS service/group call, the method further includes: judging, by the network side equipment, whether the PMCH has been allocated for the currently received MBMS service/group call; if yes, transmitting, by the network side equipment, configuration information of the allocated PMCH to the user equipment; and if no, the network side equipment allocates the PMCH for the currently received MBMS service/group call, and transmitting the configuration information of the allocated PMCH to the user equipment.

Preferably, in a case where the user equipment judges that the preconfigured MBSFN area in the adjacent target cell includes the MBSFN area used by the currently received MBMS service/group call, the method further includes: the user equipment continuously receives the currently received MBMS service/group call by using the PMCH corresponding to the MBSFN area used by the currently received MBMS service/group call currently received by the user equipment while the user equipment obtains configuration information of an MCCH of the adjacent target cell.

Preferably, the method further includes: the user equipment selects one or more to be received MBMS service/group calls from multiple MBMS service/group calls which are being performed in the adjacent target cell; and the user equipment obtains the PMCH corresponding to the one or more MBMS service/group calls selected by using the obtained configuration information of the MCCH of the adjacent target cell, and receiving the one or more MBMS service/group calls selected by using the obtained PMCH.

According to another embodiment of the disclosure, a system for requesting a PMCH is provided.

The system for requesting the PMCH according to the disclosure includes user equipment, and the user equipment includes: a determination module, configured to determine a target cell to be immigrated which is adjacent to a cell where the user equipment is camped on; and a request module, configured to, if it is judged that a preconfigured MBSFN area in the adjacent target cell does not include the MBSFN area used by the MBMS service/group call currently received by the user equipment, request a network side equipment to allocate the PMCH for the currently received MBMS service/group call.

Preferably, the request module includes: a request unit, configured to request the network side equipment to allocate the PMCH for the currently received MBMS service/group call while the user equipment continuously receives the currently received MBMS service/group call by using the PMCH of the cell where the user equipment is camped on corresponding to the MBSFN area used by the currently received MBMS service/group call.

Preferably, the system further includes the network side equipment, and the network side equipment includes: a judgment module, configured to judge whether the PMCH has been allocated for the currently received MBMS service/group call; a first transmitting module, configured to, when the judgment module judges yes, transmit configuration information of the allocated PMCH to the user equipment; and a second transmitting module, configured to, when the judgment module judges no, allocate the PMCH for the currently received MBMS service/group call, and transmit the configuration information of the allocated PMCH to the user equipment.

Preferably, the request module further includes: an obtaining unit, configured to continuously receive the currently received MBMS service/group call by using the PMCH of the cell where the user equipment is camped on corresponding to the MBSFN area used by the currently received MBMS service/group call while the user equipment obtains configuration information of an MCCH of the adjacent target cell.

Preferably, the request module further includes: a selection unit, configured to select one or more to be received MBMS service/group calls from multiple MBMS service/group calls which are being performed in the adjacent target cell; and a receiving unit, configured to obtain the PMCH corresponding to the one or more MBMS service/group calls selected by using the obtained configuration information of the MCCH of the adjacent target cell, and receive the one or more MBMS service/group calls selected by using the obtained PMCH.

By the disclosure, the UE judges whether the network side equipment needs to be requested to allocate the PMCH for the currently received MBMS service/group call according to whether a preconfigured MBSFN area in the adjacent target cell to be immigrated includes the MBSFN area used by the MBMS service/group call currently received by the UE, if no, the UE requests the network side equipment to allocate the PMCH for the currently received MBMS service/group call, thereby ensuring the service receiving continuity, solving the problem in the related art that the service cannot be received continuously when the UE which is receiving the eMBMS service moves, and further implementing the service continuity of a PTT user in a receiving state in a moving process.

BRIEF DESCRIPTION OF THE DRAWINGS

The accompanying drawings described herein serve to provide a further understanding of the disclosure, and constitute a part of this application. The schematic embodiments of the disclosure and description thereof serve to explain the disclosure rather than to limit the disclosure inappropriately. In the drawings.

DETAILED DESCRIPTION OF THE EMBODIMENTS

Hereinafter, the disclosure will be described in detail with reference to the accompanying drawings and in conjunction with the embodiments. It should be noted that the embodiments of the application and the features of the embodiments may be combined with each other without any conflict.

Figure 1:
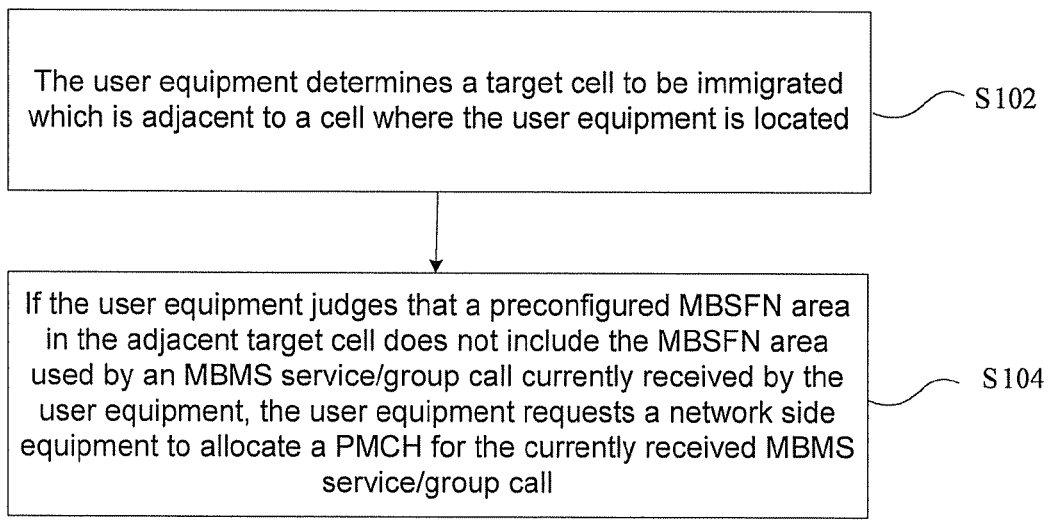
FIG. 1 is a flowchart of a method for requesting a PMCH according to an embodiment of the disclosure.

FIG. 1 is a flowchart of a method for requesting a PMCH according to an embodiment of the disclosure. As shown in FIG. 1, the method may include the following processing steps:

Step 102: the user equipment determines a target cell to be immigrated which is adjacent to a cell where the user equipment is camped on; and Step 104: if the user equipment judges that a preconfigured MBSFN area in the adjacent target cell does not include the MBSFN area used by an MBMS service/group call currently received by the user equipment, the user equipment requests a network side equipment to allocate a PMCH for the currently received MBMS service/group call.

In the related art, 1 to 8 MBSFN areas may be allocated for each cell, and configured by operator through operating and maintaining a platform (O&M). A system information block sib13 of each cell may broadcast MBSFN area information allocated by the cell, wherein the broadcast information may include an MBSFN area id of each MBSFN area and MCCH configuration information. The user equipment may read the MBSFN area information on the MCCH channel according to the MCCH configuration information, wherein the information may include PMCH configuration, an identifier TMGI of each MBMS service and a session id, and the user equipment may select the MBMS service that the user equipment itself is interesting in, and receive the MBMS service data according to the PMCH configuration corresponding to the MBMS service of interest. However, the problem existing in the related art is that, when the UE which is receiving the eMBMS service moves, the service receiving continuity cannot be kept. By the method as shown in FIG. 1, the UE judges whether the network side equipment needs to be requested to allocate the PMCH for the currently received MBMS service/group call according to whether a preconfigured MBSFN area in the adjacent target cell to be immigrated includes the MBSFN area used by the MBMS service/group call currently received by the UE, if no, the UE requests the network side equipment to allocate the PMCH for the currently received MBMS service/group call, thereby ensuring the service receiving continuity, solving the problem in the related art that the service cannot be received continuously when the UE which is receiving the eMBMS service moves, and further implementing that a PTT user in a receiving state can obtain the resource of the current MBMS service/group call of the adjacent target cell more rapidly in a moving processing, and the possibility of voice interruption is reduced significantly, to ensure the MBMS service/group call continuity of the PTT user in the receiving state in the moving process.

It should be noted that, in a case where the user equipment judges that the preconfigured MBSFN area in the adjacent target cell includes the MBSFN area used by the MBMS service/group call currently received by the user equipment, there is no need to request the network side equipment to allocate the PMCH for the currently received MBMS service/group call.

In a preferred embodiment, MBSFB area id list information of each intra-frequency and inter-frequency cell may be added to the system information of the related art. Since the MBSFN area of each cell has static configuration, and the configuration may be changed through O&M only, adding the MBSFN area id information of the adjacent target cell will not result in frequent update of the system information block (sib). The user equipment may judge whether the preconfigured MBSFN area of the target cell includes the MBSFN area used by the MBMS service/group call currently received by the user equipment through comparing whether the MBSFN area id used by the MBMS service/group call received by an original cell is included in the MBSFB area id list of the target cell.

Preferably, in Step 104, the user equipment requests the network side equipment to allocate the PMCH for the currently received MBMS service/group call may include the following processing:

the user equipment requests the network side equipment to allocate the PMCH for the currently received MBMS service/group call while the user equipment continuously receives the currently received MBMS service/group call by using the PMCH of the cell where the user equipment is camped on corresponding to the MBSFN area used by the currently received MBMS service/group call.

Preferably, in Step 104, after the user equipment requests the network side equipment to allocate the PMCH for the currently received MBMS service/group call, the method further includes the following operations:

Step 1: the network side equipment judges whether the PMCH has been allocated for the currently received MBMS service/group call;

Step 2: if yes, the network side equipment transmits configuration information of the allocated PMCH to the user equipment; and Step 3: if no, network side equipment allocates the PMCH for the currently received MBMS service/group call, and transmits the configuration information of the allocated PMCH to the user equipment.

In the preferred implementation process, the UE may be in but is not limited to the following two states:

State I: RRC_IDLE; and

State II: RRC_CONNECTED.

In the preferred embodiment, when the UE in the state of RRC_IDLE moves into an adjacent target cell from a cell where the UE is currently camped on, the UE measures the channel qualities of the serving cell and the adjacent target cell respectively. Cell reselection may be triggered as the channel quality of the serving cell of the UE is reduced and the channel quality of the adjacent target cell of the UE is increased. During the process of cell reselection, the UE first judges whether the MBSFN area list of the target cell includes the MBSFN area where the currently received MBMS service/group call is camped on. If the MBSFN area list of the target cell does not include the MBSFN area where the MBMS service of an original cell which the UE is receiving is camped on, the UE still keeps the PMCH configuration of the original cell until the configuration information of the adjacent target cell is received or the channel quality of the original cell is too bad to receive effective data. After obtaining the mib, sib1 and sib2 of the target cell, the UE initiates random access immediately after judging successful camping on the adjacent target cell, and reports the TMGI of the MBMS service/group call for which the UE expects to allocate the PMCH resource to an eNB. If the eNB finds that the current cell has allocated the resource for the MBMS service/group call, the eNB transmits MBSFN area Configuration that is already allocated for the MBMS service/group call to the UE, and the UE reconfigures the PMCH immediately according to the configuration. If the eNB finds that the current cell does not allocate the resource for the MBMS service/group call, the eNB informs an MME first, then the MME informs a PTT server, and after that, the PTT server initiates a Broadcast Multicast Service Center (BMSC) to initiate a session update flow, thereby allocating the MBSFN area in the target cell for transmitting the MBMS service/group call. After successful session update, the eNB transmits the newly allocated PMCH resource to the UE. Meanwhile, after the UE reads the sib13, the UE still needs to obtain all the MBSFN area Configurations on the MCCH, and when the UE finds that there are other MBMS service/group calls of interest in the adjacent target cell, other MBMS service/group calls still needs to be configured for a physical layer for listening.

In the preferred embodiment, for the UE in the state of RRC_CONNECTED, the UE which needs to perform handover operation, after receiving RRC Connection Reconfiguration, judges whether the MBSFN area list of the target cell in the system information includes the MBSFN area where the currently received MBMS service/group call is located. If the MBSFN area list of the target cell does not include the MBSFN area where the MBMS service of the original cell which the UE is receiving, the processing flow is similar to the processing flow of the UE in the state of RRC_IDLE, the difference is that the UE in the state of RRC_CONNECTED may directly transmit a message in the current RRC connection to inform the network side equipment that the PMCH resource of the current MBMS service/group call needs to be obtained without initiating a random access request.

Preferably, in Step 104, in a case where the user equipment judges that the preconfigured MBSFN area id list in the adjacent target cell includes the MBSFN area used by the currently received MBMS service/group cell, the method may further include the following processing:

the user equipment continuously receives the currently received MBMS service/group call by using the PMCH of the cell where the user equipment is located corresponding to the MBSFN area used by the currently received MBMS service/group call while the user equipment obtains the configuration information of the MCCH of the adjacent target cell.

Preferably, after the user equipment obtains all the MCCH configuration information of the adjacent target cell, the method may further include the following steps:

Step 4: the user equipment selects one or more to be received MBMS service/group calls from multiple MBMS service/group calls which are being performed in the adjacent target cell; and Step 5: the user equipment obtains the PMCH corresponding to the one or more MBMS service/group calls selected by using the obtained configuration information of the MCCH of the adjacent target cell, and receiving the one or more MBMS service/group calls selected by using the obtained PMCH.

In the preferred embodiment, when the UE in the state of RRC_IDLE moves into an adjacent target cell from a cell where the UE is currently located, if the MBSFN area list of the target cell includes the MBSFN area where the MBMS service of an original cell which the UE is receiving is located, the UE starts obtaining the system information of the target cell until all the MCCHs of the target cell are obtained. The UE may continuously receive the MBMS service/group call according to the PMCH configuration of the original cell while obtaining the system information of the target cell, and if the UE is interesting in other services of the target cell, the UE reconfigures the PMCH of the target cell.

In the preferred embodiment, for the UE in the state of RRC_CONNECTED, the UE which needs to perform the handover operation, after receiving the RRC Connection Reconfiguration, judges that the MBSFN area list of the target cell in the system information includes the MBSFN area where the currently received MBMS service/group call is located. The processing flow of the MBMS/group call is the same as the processing flow of the UE in the state of RRC_IDLE, so it is not described again.

Figure 2:
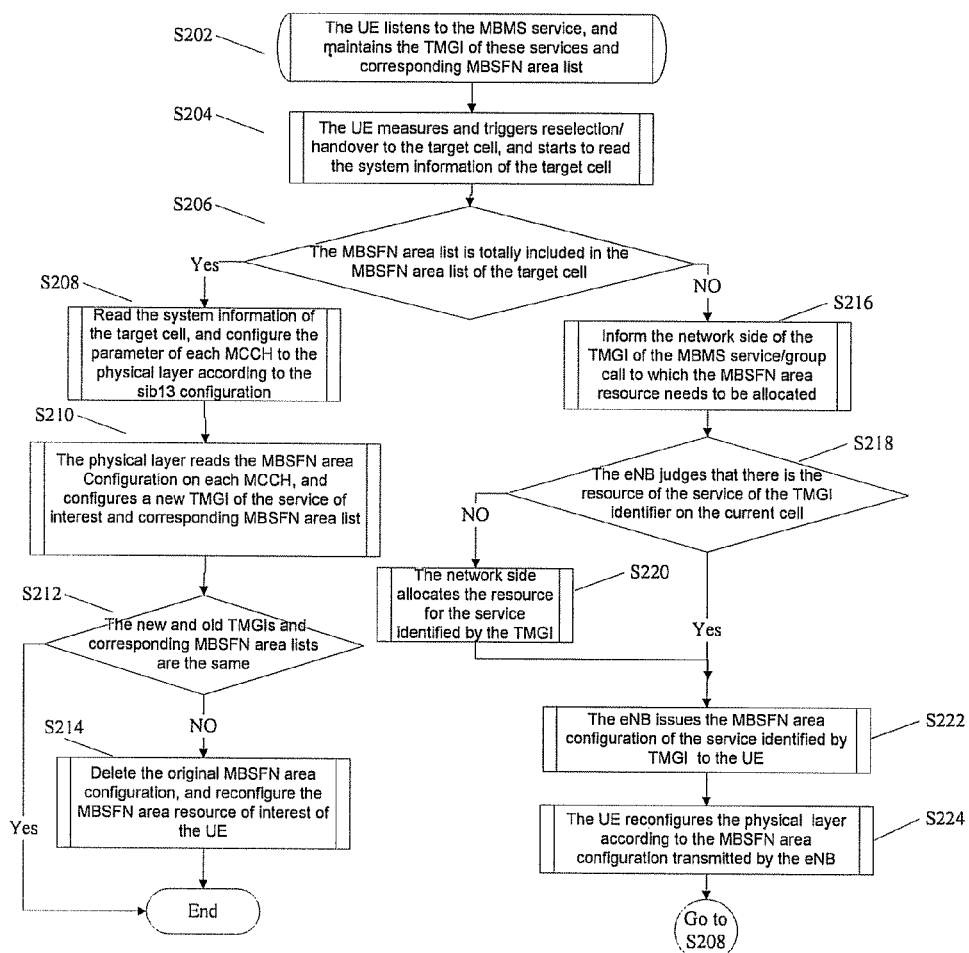
FIG. 2 is a flowchart of a method for requesting a PMCH according to a preferred embodiment of the disclosure.

The above preferred implementation process will be further described below in conjunction with the preferred embodiment as shown in FIG. 2.

FIG. 2 is a flowchart of a method for requesting a PMCH according to a preferred embodiment of the disclosure. As shown in FIG. 2, the method may include the following processing steps.

Step 202: The UE is listening to some MBMS services of interest, and at this time, the UE may be in the state of RRC_IDLE or in the state of RRC_CONNECTED In the preferred embodiment, the UE may maintain one TMGI list of the MBMS service (i.e., the MBMS service that is being received) that the UE itself is interesting in and the MBSFN area where each MBMS service is located. The UE needs to keep receiving the above data of interest after moving to the adjacent target cell from the serving cell. There may be one or more MBSFN area ids that the UE is listening to. For the PTT user, each PTT group needs to allocate one TMGI fixedly for identifying the PTT group call service. In the flow of group information update, the PTT server needs to transmit the TMGI of the group to which each UE belongs to the UE.

Step 204: The UE in the state of RRC_IDLE, during the process of moving, may determine a series of target cells which may be reselected according to reselected parameters of system information configuration of the original cell. The UE may select the target cell having the highest measurement rank (for example: a signal strength or other parameters). If the UE judges that the camping is failure according to the system information of the target cell, the UE re-attempts to measure the cell having a higher rank. The UE immediately starts reading the system information of the target cell after determining the target cell.

In the preferred embodiment, the UE in the state of RRC_CONNECTED performs the measurement according to a measurement control message issued by the eNB. During the process of moving, the UE measures the channel qualities of the serving cell and the adjacent target cell respectively, the measurement may be trigged to be reported as the channel quality of the serving cell of the UE is reduced and the channel quality of the adjacent target cell of the UE is increased. At this time, the eNB decides that the UE needs to be switched to a certain target cell according to the current measurement result of the UE and the resource consumption of the adjacent cell. The UE starts configuring the configuration information of the target cell after receiving the RRC Connection Reconfiguration message. After the successful synchronization of a physical layer, the UE replies a reconfiguration completion message, then starts to read the system information in the adjacent target cell. The UE needs to receive the mib, sib1 and sib2, the UE supporting the MBMS also needs to read the sib13, and other sibs may not be received temporarily.

Step 206: The UE judges whether the MBSFN area list of the target cell includes all the areas in the MBSFN area list maintained by the UE, if the MBSFN area list includes all the areas, then Step 208 is continuously executed; otherwise, the UE records which MBSFN areas are not included in the list of the target cell, and Step 216 is executed.

It should be noted that, regardless of whether the MBSFN area list of the target cell includes the MBSFN area where the current service is located, before the UE obtains the MBMS service configuration of the target cell, the configuration information of the original cell remains unchanged, that is, the current MBMS service is continuously received according to the configuration of the original cell.

In the preferred embodiment, the UE in the state of RRC_IDLE obtains the MBSFN area list included in the target cell from the extended system information, may obtain the MBSFN area list from the sib4 if the target cell is an intra-frequency cell, and may obtain the MBSFN area list from the sib5 if the target cell is an inter-frequency cell. The eNB needs to inform the UE of the MBSFN area list included in each intra-frequency and inter-frequency adjacent cell in the extended sib4 and sib5. The UE in the RRC_CONNECTED obtains the MBSFN area list included in the target cell from the extended RRC Connection Reconfiguration message, and in the message transmits the MBSFN area list included in the cell to the UE when the eNB configures the message.

Step 208: When the UE reads the sib13 in the system information of the target cell, a Radio Resource Control (RRC) layer of the UE periodically configures the MCCH configuration and MCCH change notification of the target cell and transmits to the physical layer, and the physical layer starts listening to an MCCH change notification message according to the updated configuration information.

Step 210: The RRC layer of the UE requests the physical layer to read the MBSFN Area Configuration on all the MCHHs, and the UE may select to receive the TMGI identifier service expect for the TMGI list which is being received. When the RRC layer of the UE obtains all the MBMS services that are being performed in the target cell, the UE may configure a new TMGI list of the service of interest and the MBSFN area where it is located.

Step 212: The RRC layer of the UE judges whether newly configured TMGI list of the MBMS service of interest and the MBSFN area list where it is located are the same as the contents of the list in the original cell maintained by the RRC layer, if the same, the UE continues receiving the service according to the MBMS relevant configuration in the original cell, the flow ends, and if different, Step 214 is then executed.

Step 214: The RRC layer of the UE deletes the old physical layer, a Medium Access Control (MAC) layer, a Radio Link Control (RLC) layer and a configuration related to the MBMS service, and transmits the configuration related to the MBSFN area where the new service of interest is located to the physical layer, the MAC layer and the RLC layer, and the flow ends.

Step 216: The UE marks those MBSFN areas in the MBSFN area list of the received service appearing in the original cell but not included in the MBSFN area list of the target cell and the TMGI indicating that the corresponding user is receiving the service, and transmits the information to the eNB.

In the preferred embodiment, the UE in the RRC_IDLE state, after reading the mib, sib1 and sib2, determines that the adjacent target cell may be camped on and may initiate random access, and transmits the information to the network side equipment. The UE in the state of RRC_CONNECTED, after being switched to the adjacent target cell successfully, may transmit the DCCH message to the network side equipment.

It should be noted that the message used to transmit the TMGI and the original MBSFN area herein may be an extension to the message in the related art, and may also be a newly added private message.

Step 218: The eNB queries whether the resource is already allocated to the TMGI identifier in the current cell according to the TMGI in the received message, if yes, Step 222 is executed; otherwise, Step 220 is then executed.

Step 220: The network side equipment allocates the resource for the service of the TMGI identifier. The process may include that: the eNB informs the PTT server through the MME that the resource is not allocated to the service of the TMGI identifier in which MBSFN area, then informs the BM-SC by the PTT server, and finally initiates the flow of MBSFN area resource allocation by the BM-SC.

Figure 3:
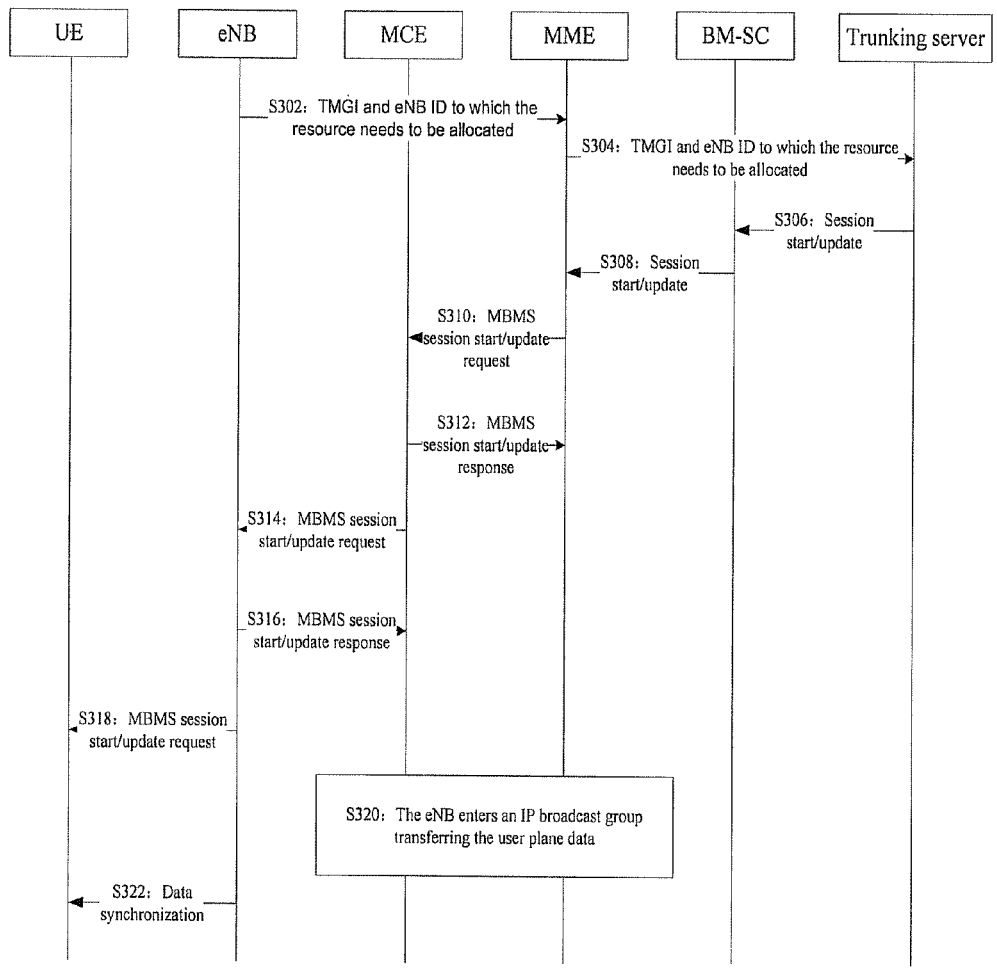
FIG. 3 is a flowchart of a network side equipment allocating a resource according to a preferred embodiment of the disclosure.

In the preferred embodiment, FIG. 3 is a flowchart of a network side equipment allocating a resource according to a preferred embodiment of the disclosure. As shown in FIG. 3, the flow may include the following steps:

Step 302: a new notification message is added between the eNB and the MME to inform that the MBSFN area resource is allocated to the MBMS service of which TMGI identifier in the eNB;

Step 304: the MME forwards the eNB identifier to which the MBSFN area resource needs to be allocated and the TMGI of the group call to the PTT server;

Step 306: the PTT server judges that the MBSFN resource is not allocated to the MBMS service of the current TMGI identifier, informs the BM-SC to initiates the session start flow, and if the MBSFN resource is already allocated to the MBMS service of the current TMGI identifier, informs the BM-SC to initiates the session update flow;

Step 308: the BM-SC informs the MME to initiates the MBMS session start/update flow;

Step 310: the MME transmits an MBMS session start/update Request to a Multi-cell/multicast Coordination Entity (MCE) which controls the eNB resource allocation;

Step 312: the MCE judges whether there is enough MBSFN area resource to be allocated, if yes, the MCE selects the allocated MBSFN area and the relevant PMCH resource configuration, and replies an MBMS session start/update response to the MME;

Step 314: the MCE transmits the MBMS session start/update Request to all the eNBs in the selected MBSFN areas;

Step 316: the eNB replies to the MCE and confirms receipt the MBMS session start/update;

Step 318: the eNB transmits an MCCH change notification to the UE, informs the UE which MCCH changes the configuration, and at the same time, updates the MCCH configuration information;

Step 320: the UE enters an IP broadcast group, and receives MBMS user plane data; and Step 322: the eNB transmits MBMS service data at a determined time point.

Step 222: The eNB transmits the MBSFN area configuration of the service of the TMGI identifier requested by the UE to the UE through an air interface message.

Step 224: The UE reconfigures the physical layer, the MAC and the RLC according to the MBSFN area configuration corresponding to each TMGI in the response message of the eNB, and after configuration, Step 208 is then executed.

Compared to the technical schemes in the related art, since the UE moving results in the change of the MBSFN area where the service being listened is located, the resource information configured for the service being listened by the adjacent target cell may be obtained more rapidly. The technical schemes in the related art needs to read sib13 first, then configures the MCCH and needs to read all the MCCHs, to judge whether the PMCH resource of the currently received service exists. However, the scheme is limited to repetition period of the MCCH configuration, the longer the period is, the longer the time when the new resource is obtained is. According to the regulations of the protocol in the related art, the above period may be rf32, rf64, rf128 and rf256, wherein rf is a radio frame, the length of which is 10 ms. After reading all the MCCH, it is still found that there is no new resource of the currently received service, so the UE still needs to interact with the network side equipment to request resource allocation. Moreover, according to the technical schemes provided by the disclosure, the MBSFN area of the adjacent area of the broadcast may be so that the UE may judge whether the network side equipment needs to be requested to allocate the new resource during reselection and handover, that is, after reading the mib, sib1 and sib2 during reselection or successful handover, the network side equipment may be requested to allocate the resource, without waiting to read the sib13 and the MBSFN area configuration information on all the MCCHs.

Figure 4:
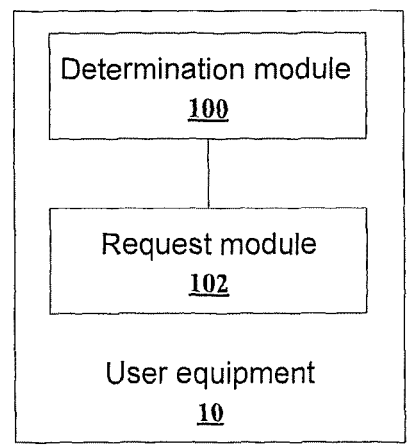
FIG. 4 is a structural diagram of a system for requesting a PMCH according to an embodiment of the disclosure.

FIG. 4 is a structural diagram of a system for requesting a PMCH according to an embodiment of the disclosure. As shown in FIG. 4, the system may includes a user equipment 10, and the user equipment 10 includes: a determination module 100, configured to determine a target cell to be immigrated which is adjacent to a cell where the user equipment is located; and a request module 102, configured to, if it is judged that a preconfigured MBSFN area in the adjacent target cell does not include the MBSFN area used by the MBMS service/group call currently received by the user equipment, request a network side equipment to allocate a PMCH for the currently received MBMS service/group call.

By the system as shown in FIG. 4, the problem in the related art that when the UE which is receiving the eMBMS service moves, the service receiving continuity cannot be kept is solved, and the service continuity of the PTT user in a receiving state in a moving process is implemented.

Figure 5:
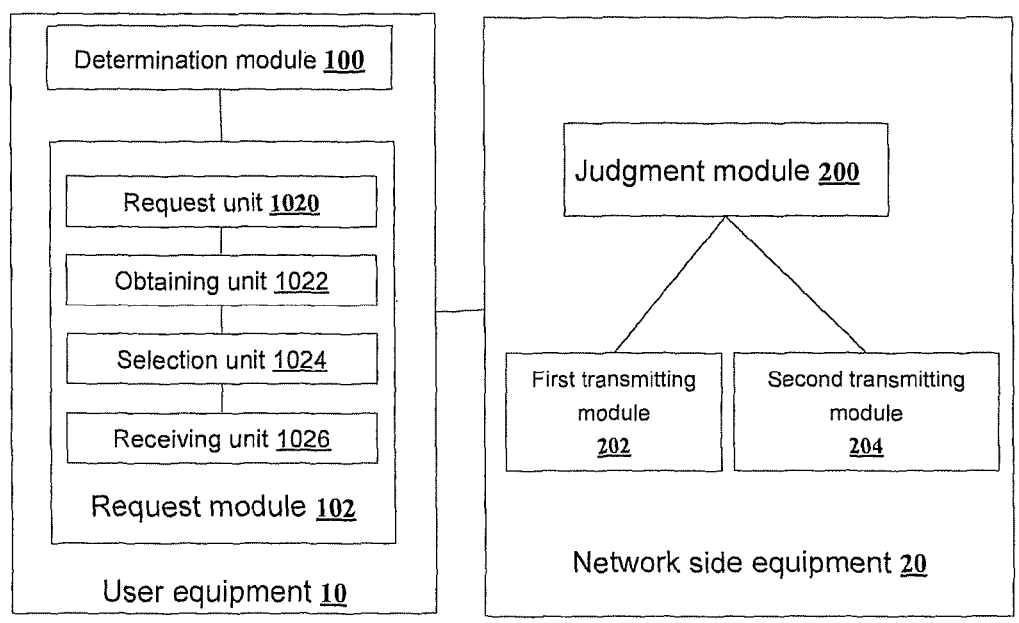
FIG. 5 is a structural diagram of a system for requesting a PMCH according to an embodiment of the disclosure.

Preferably, as shown in FIG. 5, the request module 102 may include: a request unit 1020, configured to request the network side equipment to allocate the PMCH for the currently received MBMS service/group call while the user equipment continuously receives the currently received MBMS service/group call by using the PMCH of the cell where the user equipment is located corresponding to the MBSFN area used by the currently received MBMS service/group call.

Preferably, as shown in FIG. 5, the above system may further include: the network side equipment 20, the network side equipment 20 may include: a judgment module 200, configured to judge whether the PMCH has been allocated for the currently received MBMS service/group call; a first transmitting module 202, configured to, when the judgment module judges yes, transmit configuration information of the allocated PMCH to the user equipment; and a second transmitting module 204, configured to, when the judgment module judges no, allocate the PMCH for the currently received MBMS service/group call, and transmit the configuration information of the allocated PMCH to the user equipment.

Preferably, as shown in FIG. 5, the request module 102 may further include: an obtaining unit 1022, configured to continuously receive the currently received MBMS service/group call by using the PMCH of the cell where the user equipment is located corresponding to the MBSFN area used by the currently received MBMS service/group call while the user equipment obtains configuration information of a Multipoint Control Channel (MCCH) of the adjacent target cell.

Preferably, as shown in FIG. 5, the request module 102 may further include: a selection unit 1024, configured to select one or more to be received MBMS service/group calls from multiple MBMS service/group calls which are being performed in the adjacent target cell; and a receiving unit 1026, configured to obtain the PMCH corresponding to the one or more MBMS service/group calls selected by using the obtained configuration information of the MCCH of the adjacent target cell, and receive the one or more MBMS service/group calls selected by using the obtained PMCH.

It should be noted that, the preferred working mode in which each module and each unit as shown in FIG. 4 and FIG. 5 interact with each other may refer to the embodiments as shown in FIG. 1 to FIG. 3, and no further description is provided herein.

It may be seen from the above description that the following technical effects (it should be noted that these effects are effects that may be achieved by some preferred embodiments) are implemented in the above embodiments: the problem in the related art that the service cannot be received continuously when the UE which is receiving the eMBMS service moves, and the fact that a PTT user in a receiving state can obtain the resource of the current MBMS service/group call of the adjacent target cell more rapidly in a moving processing is implemented, and the possibility of voice interruption is reduced significantly, to ensure the MBMS service/group call continuity of the PTT user in the receiving state in the moving process.

Obviously, those skilled in the art should understand that each of the mentioned modules or steps of the disclosure may be achieved by a universal computing apparatus; the modules or steps may be integrated on single computing apparatus, or distributed in a network formed by multiple computing apparatuses. Selectively, they may be achieved by a program code which may be executed by the computing apparatus. Thereby, the modules or steps may be stored in a storage apparatus and executed by the computing apparatus, or may be respectively manufactured as each integrated circuit module, or multiple modules or steps thereof may be manufactured as single integrated circuit module. In this way, the disclosure is not limited to any particular combination of hardware and software.

The above are only the preferred embodiments of the disclosure and are not intended to limit the disclosure, for those skilled in the art, various changes and variations may be made to the disclosure. Any modifications, equivalent replacements, improvements and the like within the spirit and principle of the disclosure shall be contained within the scope of protection of the claims of the disclosure.

What is claims is:

1. A method for requesting a Physical Multicast Channel (PMCH), comprising:
    after reselecting or handover to a target cell, a user equipment (UE) that receives an Multimedia Broadcast Multicast Services (MBMS) service sending as request message through an Radio Resource Control (RRC) connection to a network side device to request the network side device to allocate PMCH resources for the MBMS service that is expected to receive;
    receiving, by the UE, a PMCH resources allocation message sent from the network side device via the RRC connection;
    wherein receiving, by the UE, the PMCH resources allocation message sent from the network side device via the RRC connection further comprising:
    inquiring, by the network side device, whether the MBMS service that the UE expect to receive has been broadcasted in the cell;

when the MBMS service has already been broadcasted in the cell, sending, by the network side device, the allocated PMCH resource corresponding to the MBMS service to UE through the PMCH resources allocation message, when the MBMS service has not been broadcasted in the cell, allocating, by the network side device, the PMCH resource for the UE, and sending, by the network side device, the PMCH resource to the UE via the PMCH resources allocation message.

2. The method according to claim 1, wherein the request message carries an identity of the MBMS service that is expected to be received.

3. The method according to claim 1, further comprising:
continuously receiving, by the UE, the currently received MBMS service or group call by using the PMCH corresponding to the Multicast Broadcast Single Frequency Network area (MBSFN area) used by the currently received MBMS service or group call currently received by the UE while the UE sending a request message to the network side device to request the network side device to allocate PMCH resources for the currently received MBMS service.

4. The method according to claim 1, further comprising:
selecting, by the user equipment, one or more to be received MBMS service or group calls from multiple MBMS service or group calls which are being performed in the adjacent target cell; and
obtaining, by the user equipment, the PMCH corresponding to the one or more MBMS service or group calls selected by using the obtained configuration information of the Multicast Control Channel (MCCH) of the adjacent target cell, and receiving the one or more MBMS service or group calls selected by using the obtained PMCH.

5. A system for requesting a Physical Multicast Channel (PMCH), and the system comprises a user equipment,
the user equipment comprising:
a request module, configured to, after reselecting or handover to a target cell, a user equipment (UE) that receives an Multimedia Broadcast Multicast Services (MBMS) service send a request message through an Radio Resource Control (RRC) connection to a network side device to request the network side device to allocate PMCH resources for the MBMS service that is expected to receive; and a receive module, configured to receive a PMCH resources allocation message sent from the network side device via the RRC connection;
wherein the system further comprises the network side equipment, the network side equipment comprising:
a judgment module, configured to inquire whether the MBMS service that the UE expect to receive has been broadcasted in the cell;
a first transmitting module, configured to, when the judgment module judges yes, seed the allocated PMCH resource corresponding to the MBMS service to UE through the PMCH resources allocation message; and
a second transmitting module, configured to, when the judgment module judges no, reallocate the PMCH resource for the UE, and sending, by the network side device, the PMCH resource to the UE via the PMCH resources allocation message.

6. The system according to claim 5, the request message carries the identity of the MBMS service that is expected to be received.

7. The system according to claim 5, wherein the request module further comprises:
an obtaining unit, configured to continuously receive the currently received MBMS service or group call by using the PMCH of the cell where the user equipment is located corresponding to the Multicast Broadcast Single Frequency Network area (MBSFN) area used by the currently received MBMS service or group call while the UE sending a request message to the network side device to request the network side device to allocate PMCH resources for the currently received MBMS service.

8. The system according to claim 5, wherein the request module further comprises:
a selection unit, configured to select one or more to be received MBMS service or group calls from multiple MBMS service or group calls which are being performed in the adjacent target cell; and
a receiving unit, configured to obtain the PMCH corresponding to the one or more MBMS service or group calls selected by using the obtained configuration information of the Multicast Control Channel (MCCH) of the adjacent target cell, and receive the one or more MBMS service or group calls selected by using the obtained PMCH.

* * * * *